United States Patent
Chmiel et al.

(10) Patent No.: US 10,303,962 B2
(45) Date of Patent: May 28, 2019

(54) METHOD AND SYSTEM FOR GENERATING MACHINE-READABLE BIOMETRIC DATA

(71) Applicant: ZTECH, INC., Cleveland, OH (US)

(72) Inventors: Alan Chmiel, Avon Lake, OH (US); Christopher Sheehan, Lakewood, OH (US); Bradley Humphreys, Lakewood, OH (US)

(73) Assignee: ZTech, Inc., Cleveland, OH (US)

( * ) Notice: Subject to any disclaimer, the term of this patent is extended or adjusted under 35 U.S.C. 154(b) by 0 days.

(21) Appl. No.: 15/140,021

(22) Filed: Apr. 27, 2016

(65) Prior Publication Data

US 2016/0314367 A1    Oct. 27, 2016

Related U.S. Application Data (60) Provisional application No. 62/153,246, filed on Apr. 27, 2015.

(51) Int. Cl.
| | |
|---|---|
| *G06K 9/00* | (2006.01) |
| *G06K 9/48* | (2006.01) |
| *H04L 29/06* | (2006.01) |
| *G06F 16/583* | (2019.01) |

(52) U.S. Cl.
CPC ....... *G06K 9/00885* (2013.01); *G06F 16/583* (2019.01); *H04L 63/083* (2013.01); *H04L 63/0861* (2013.01); *G06K 2209/03* (2013.01)

(58) Field of Classification Search
CPC .......... G06K 9/00885; G06K 2209/03; G06K 2009/00932; G06F 17/30247; G06F 21/32; H04L 63/0861; G07C 9/00158; G07C 9/00087

USPC ........ 382/115, 128, 301, 117, 118, 139, 161, 382/190, 198, 305

See application file for complete search history.

(56) References Cited

U.S. PATENT DOCUMENTS

| | | | |
|---|---|---|---|
| 6,600,823 B1* | 7/2003 | Hayosh | G06Q 20/042 380/51 |
| 7,761,310 B2* | 7/2010 | Rodgers | A61B 5/1113 705/2 |
| 8,165,893 B1* | 4/2012 | Goldberg | G06Q 40/08 705/2 |
| 8,402,040 B2* | 3/2013 | Mallalieu | G07C 9/00087 707/722 |

(Continued)

*Primary Examiner* — Sheela C Chawan
(74) *Attorney, Agent, or Firm* — Hahn Loeser & Parks LLP (57) ABSTRACT

Methods, computer readable storage media, and systems are provided for generating machine-readable biometric data from a medical device, which may include: obtaining an image of the medical device including a display of the medical device; retrieving a reference image of a reference display corresponding to the medical device, the reference image defining a reference data field within the reference display; comparing the image to the reference image to identify a data field within the display corresponding to the reference data field within the reference display; identifying one or more alpha-numeric symbols within the data field; and converting the alpha-numeric symbols into the machine-readable biometric data. The machine-readable biometric data may be used to create a data record for a user of the medical device, and can be communicated to an Independent Diagnostic Testing Facility (IDTF) database or server.

17 Claims, 6 Drawing Sheets

(56) References Cited

U.S. PATENT DOCUMENTS

| | | | | |
|---|---|---|---|---|
| 9,014,436 B2* | 4/2015 | Cavanagh | ............ | G06K 9/00885 |
| | | | | 382/115 |
| 2014/0233788 A1* | 8/2014 | Fox | ................... | G06F 19/3418 |
| | | | | 382/103 |
| 2015/0261919 A1* | 9/2015 | Shiho | .................... | G06F 19/322 |
| | | | | 705/3 |
| 2016/0278648 A1* | 9/2016 | Vogel | ................ | A61B 5/02438 |

* cited by examiner

METHOD AND SYSTEM FOR GENERATING MACHINE-READABLE BIOMETRIC DATA

CROSS-REFERENCE TO RELATED APPLICATION

This U.S. patent application is a non-provisional application of and claims priority to and the benefit of U.S. Provisional Patent Application No. 62/153,246, filed Apr. 27, 2015, the disclosure of which is incorporated herein by reference in its entirety.

FIELD OF THE INVENTION

Embodiments of the subject matter disclosed herein relate to capturing and extracting machine-readable data from a medical device that displays alpha-numeric information as a medical result to a user.

BACKGROUND AND SUMMARY

The systems and methods related to diagnosis of ailments often require the analysis of biological signs and biometric data obtained from a medical device. These devices may not integrate the ability to capture, archive, and transmit this biometric data, and may have no means for connecting to a computer or computer network to transfer biometric data from the medical device to a database record.

It may be desirable to have a system and method that differs from those systems and methods that are currently available.

BRIEF DESCRIPTION

Disclosed herein, in one aspect, is a method comprising generating machine-readable biometric data from a medical device, the generating comprising: obtaining an image of the medical device, the image including a display of the medical device; retrieving a reference image of a reference display corresponding to the medical device, the reference image defining a reference data field within the reference display; comparing the image to the reference image to identify a data field within the display corresponding to the reference data field within the reference display; identifying, within the data field, one or more alpha-numeric symbols; and converting the one or more alpha-numeric symbols into the machine-readable biometric data.

Also disclosed herein, in another aspect, is a computer program product comprising a computer usable medium having computer-executable code stored thereon, the computer-executable code comprising instructions for carrying out a method, the method comprising generating machine-readable biometric data from a medical device, the generating comprising: obtaining an image of the medical device, the image including a display of the medical device; retrieving a reference image of a reference display corresponding to the medical device, the reference image defining a reference data field within the reference display; comparing the image to the reference image to identify a data field within the display corresponding to the reference data field within the reference display; identifying, within the data field, one or more alpha-numeric symbols; and converting the one or more alpha-numeric symbols into the machine-readable biometric data.

Also disclosed herein, in yet another aspect, is a system including a medical device comprising a display, wherein the medical device is configured to obtain biometric data from a user of the medical device and show the biometric data on the display; a device configured to create an image of the medical device, the image including the display of the medical device; a database comprising a reference image of a reference display corresponding to the medical device, the reference image defining a reference data field within the reference display; a computer program product comprising a computer usable medium having computer-executable code stored thereon, the computer-executable code comprising instructions for carrying out a method of generating machine-readable biometric data from a medical device, the generating comprising: obtaining the image of the medical device; retrieving the reference image; comparing the image to the reference image to identify a data field within the display corresponding to the reference data field within the reference display; identifying, within the data field, one or more alpha-numeric symbols; and converting the one or more alpha-numeric symbols into the machine-readable biometric data.

Other details, objects and advantages of the present invention will be apparent in the following description and drawings of embodiments of the invention.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Embodiments of the innovation relate to methods, computer program products, and systems for generating machine-readable biometric data from a medical device. The medical device may include a display, and the display may include one or more data fields that include one or more alpha-numeric symbols that communicate biometric data. An image of the medical device, including the display, may be obtained and compared to a reference image corresponding to that medical device. The comparison allows for identification of data fields in the display captured in the image, and identification of the alpha-numeric symbols within the data fields. The identified alpha-numeric symbols may then be converted into machine-readable biometric data. The machine-readable biometric can be communicated to, for example, an Independent Diagnostic Testing Facility (IDTF) database or server, wherein an electronic record can be created or appended for a user of the medical device.

With reference to the drawings, like reference numerals designate identical or corresponding parts throughout the several views. However, the inclusion of like elements in different views does not mean a given embodiment necessarily includes such elements or that all embodiments of the invention include such elements.

The term "device" as used herein can be defined as a portion of hardware or software that can capture an image or a video, wherein the video can be a series of images. The device can be configured to capture an image or a portion of a video. In an example, the device can be a smartphone, tablet, digital camera, and the like, of which a user can use the device to capture an image.

The term "medical device" as used herein may be any apparatus configured to obtain, capture, or record biometric data for a user of the medical device. The medical device may be configured to obtain biometric data such as, but not limited to, a blood pressure, a heart rate, a glucose level, a weight, a blood oxygen level, clotting tendency of blood, and so on. The medical device may have a display including data fields that display alpha-numerically formatted biometric data to the user of the medical device, such as but not limited to an LCD or LED digital display.

The term "component" or "engine" as used herein can be defined as a portion of hardware, a portion of software, or a combination thereof. A portion of hardware can include at least a processor and a portion of memory, wherein the memory includes an instruction to execute.

The term "module" as used herein can be defined as a portion of hardware, a portion of software, a portion of logic, or a combination thereof. A portion of hardware or a portion of logic can include at least a processor and a portion of memory, wherein the memory includes one or more instructions for execution.

Figure 1:
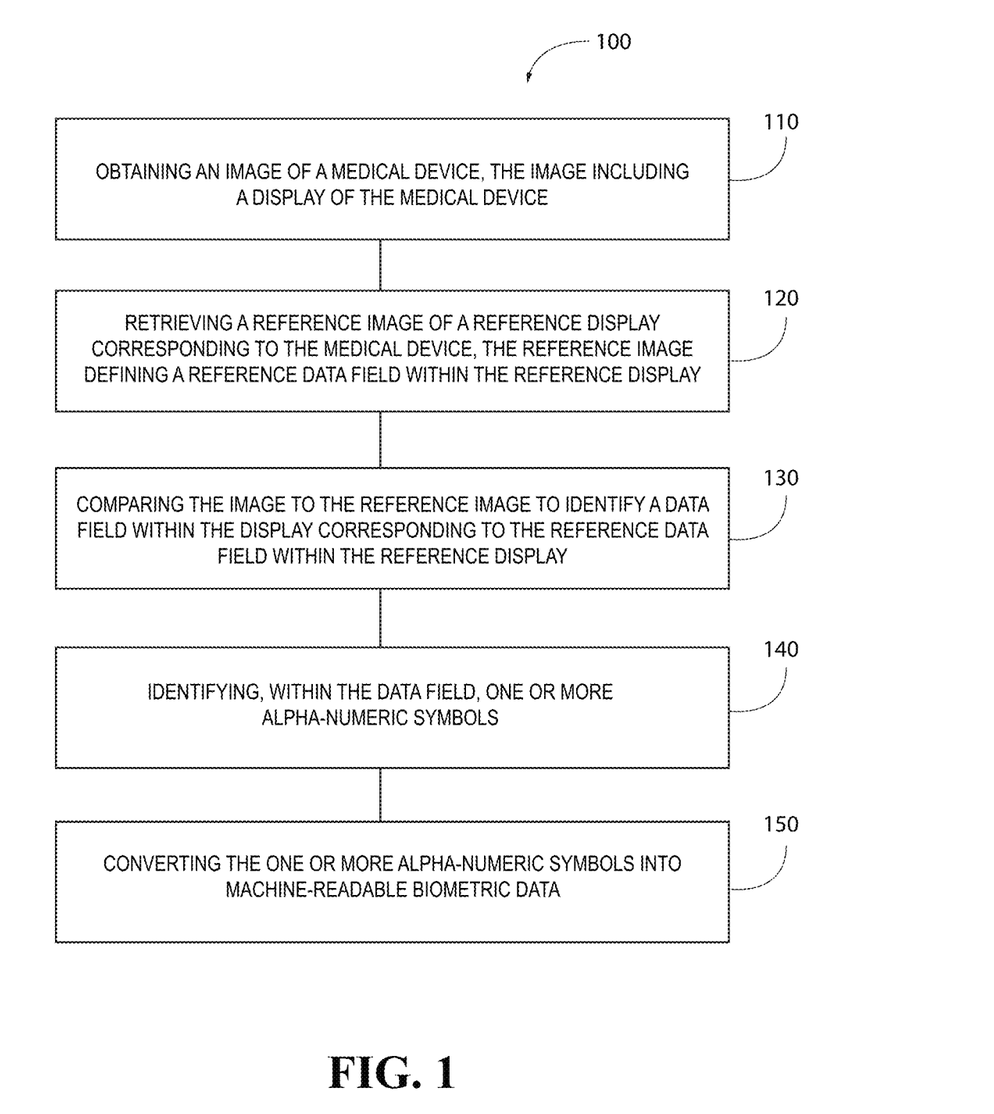
FIG. 1 is a block flow diagram illustrating an embodiment of a method of generating machine-readable data from a medical device, in accordance with one or more aspects of the present invention.

FIG. 1 is a block flow diagram of an embodiment of a method 100 of generating machine-readable biometric data from a medical device. The method 100 illustrated includes, at block 110, obtaining an image of a medical device, the image including a display of the medical device, and at block 120 retrieving a reference image of a reference display corresponding to the medical device, the reference image defining a reference data field within the reference display. The process further includes, at block 130, comparing the image to the reference image to identify a data field within the display corresponding to the reference data field within the reference display. Finally, the process includes, at block 140, identifying within the data field one or more alpha-numeric symbols, and at block 150 converting the one or more alpha-numeric symbols into the machine-readable biometric data.

In one embodiment, method 100 of FIG. 1 may further include identifying a user of the medical device and obtaining machine-readable user data corresponding to the user. The method 100 may further include correlating the machine-readable biometric data to the machine-readable user data to create a data record for the user. As discussed further below, a data record for the user may be stored on a device 212 used to capture or create the image of the medical device, or may be transmitted to a computing device 202 running one or more software application 204 and stored on computing device 202, or may be stored on other alternative computing apparatuses. Identifying the user of the medical device may include or require the user to provide user authentication data, such as a login username and password, to a website.

In another embodiment of method 100 of FIG. 1, the method may include optically capturing the image of the medical device, and retrieving the reference image may include accessing a plurality of reference images measuring a correlation between the image and one or more of the plurality of reference images using a two-dimensional (2D) registration process. A degree of correlation between the image and each of the plurality of reference images may be quantified, and the reference image having the highest degree of correlation may be selected and retrieved.

In one embodiment of method 100, the display of the medical device may comprise a digital display in which the one or more alpha-numeric symbols are presented as one or more digitally formatted alpha-numeric symbols. For example, many medical devices such as blood pressure monitors, thermometers, scales, glucose monitors, and other devices may present a user's biometric data as digital numbers and/or letters on an LCD or LED digital display. Digitally formatted alpha-numeric symbols are generally formatted identically regardless of the type of device or display that is displaying the symbols. Generally, in digital formatting each alpha-numeric symbol is presented to be distinct from any other digitally formatted alpha-numeric symbol. Identification 140 of the alpha-numeric symbols may be facilitated by taking advantage of this uniform formatting of digitally displayed symbols, as any one type of symbol will appear nearly identically across numerous types of diverse medical devices. Identifying the one or more alpha-numeric symbols 140 may thus include, in one example, identifying an overall shape of the symbol. In another example, the identifying 140 may include identifying each individual line segment that is included in the digitally formatted symbol, and assembling or compiling the identified line segments to identify the alpha-numeric symbol presented on the display.

In another embodiment of method 100, the one or more alpha-numeric symbols within the data field may comprise at least one symbol corresponding to data and at least one other symbol corresponding to a data type associated with the data. For example, the medical device in one instance may be a heart rate monitor configured to display a user's heart rate in beats per minute. The display may display the heart rate as numeric digits within the data field, and may display "BPM" next to the numeric digits within the data field, the digits corresponding to heart rate data and "BPM" corresponding to the data type (e.g. a data type of "beats per minute," a data type of "heart rate," etc.). Identifying the one or more alpha-numeric symbols 140 may include parsing the symbols into the data and the data type. Continuing the example above, in one instance the user's heart rate may be 76 beats per minute, and the display may show the number "76" beside "BPM" within the data field of the display. The process may identify each of the alpha-numeric symbols "7," "6," "B," "P," and "M," and parse the field into data comprising the number "76" and a data type comprising the letters "BPM."

In one example embodiment of method 100, converting the alpha-numeric symbols into machine-readable biometric data 150 may include converting the data into a machine-readable data and converting the data type into a machine-readable data type, so that the machine-readable data and machine-readable data type together comprise the machine-readable biometric data. Continuing the example above, the data "76" may be converted to machine readable data corresponding to the number "76," and the data type "BPM" may be converted to machine readable data type corresponding to heart rate or beats per minute. Together the machine readable data "76" and data type "BPM" may comprise the machine-readable biometric data "76 BPM" or "76 beats per minute."

In an alternative example of method 100, the reference image defining the reference data field may further define a reference data type, and converting the alpha-numeric symbols into machine-readable biometric data 150 may include converting the data into a machine-readable data and combining the machine readable data with the reference data type to generate the machine-readable biometric data. For example, the heart rate monitor of the previous example may display the number "76," with or without any symbols identifying the data type (e.g., heart rate or BPM) corresponding to the number. The reference image corresponding to the heart rate monitor may define a "heart rate" or "BPM" reference data type, for example, along with the reference data field corresponding to the heart rate portion of the display. The number "76" may be identified and converted to machine-readable data, and combined with the corresponding reference data type to generate the machine readable biometric data.

In one embodiment of method 100, the data field may be one data field of a plurality of data fields and the reference data field may be one reference data field of a plurality of reference data fields, so that the plurality of data fields correspond to the plurality of reference data fields. Identifying 140 may then further include identifying one or more alpha-numeric symbols within at least one other data field of the plurality of data fields, and the converting 150 may further include converting the one or more alpha-numeric symbols of the at least one other data field into additional machine-readable biometric data. For example, the heart rate monitor of the prior examples may not only display a user's measured heart rate in the display of the monitor, but may also display a date field and a time field where the date and time of the heart rate measurement are displayed. The alpha-numeric symbols in these additional fields may also be identified and converted into machine-readable biometric data. Each piece of machine-readable biometric data may be made part of the data record created for the user.

In yet another embodiment, the method 100 may further include dividing the data field within the image into a plurality of regions. Each region of the plurality of regions may include one alpha-numeric symbol or a plurality of alpha-numeric symbols, but generally may include fewer than all of the alpha-numeric symbols within the entire data field. The identifying 140 may then include identifying one or more alpha-numeric symbols within each region of the plurality of regions. In such an embodiment, the method 100 may further include assembling the identified one or more alpha-numeric symbols prior to converting the one or more alpha-numeric symbols into the machine-readable data. Dividing the data field into a plurality of regions may allow identifying of the one or more alpha-numeric symbols 140 to be executed at a faster rate, as the process of identifying each symbol may be carried individually on each separate symbol rather than on the group of alpha-numeric symbols as a whole. Identifying alpha-numeric symbols within each of the plurality of regions may be carried out in sequence or simultaneously.

As the disclosures below further detail and illustrate, any one or more embodiments of method 100 may be performed via a single device, or portions of embodiments of method 100 may be performed by multiple devices. For example, as detailed further below, a mobile device such as a smartphone may include a computer program configured to obtain the image of the medical device, retrieve the reference image and perform the comparison of the image with the reference image, identify the one or more alpha-numeric symbols and convert those symbols into machine-readable code. In another example, a mobile device may be configured to capture the image of the medical device, and to allow the user of the medical device to transmit the image to another computer system, where the computer system includes a computer program to retrieve the reference image and perform the comparison of the image with the reference image, identify the one or more alpha-numeric symbols and convert those symbols into machine-readable code. Other examples are possible and several are described below.

Figure 2:
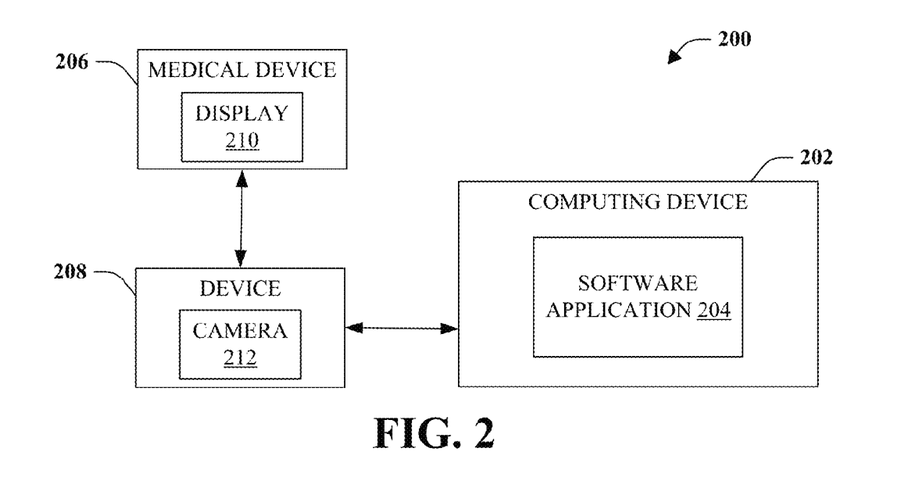
FIG. 2 is an illustration of a system that captures an image of a medical device to identify biometric information displayed, in accordance with one or more aspects of the present invention.

FIG. 2 illustrates one example embodiment of a system 200 that is configured to perform analysis on a captured image to extract biometric data collected by a medical device and generate machine-readable biometric data. The system 200 can include a device 208 having a camera 212 that is configured to capture an image of a display 210 that displays biometric data collected by a medical device 206. The captured image can be communicated to a computing device 202 that includes a software application 204. The software application 204 may include instructions that may be executed by the computing device 202 to carry out, for example, any of the embodiments of method 100 or any alternative embodiments thereof. Thus, biometric data is extracted from the captured image by performing or executing the image analysis or algorithm.

In an example, the software module 204 can obtain an image from the device 208 and compare the image to a reference image corresponding to the medical device 206 stored in a database or memory, wherein the reference image can include baseline data indicating at least one of a type of a medical device, a reference data field for alpha-numeric information, a reference data type corresponding to the reference data field, and the like.

The device 208 can be configured to capture an image or a portion of a video. For instance, the device 208 can be a stand-alone device (as depicted). In another embodiment, the device 208 can receive biometric data from a medical device and be displayed on the device 206, wherein the device 206 employs a screenshot as the captured image. In another example, the device 208 can be a smartphone, tablet, digital camera, and the like, of which a user can use the device 208 to capture an image of the display 210.

The device 208 can employ an authentication protocol to verify an identify of the user and verify the biometric data corresponds to the user. This can provide assurance as to authenticity of biometric data and extraction of such data from a captured image.

Figure 3:
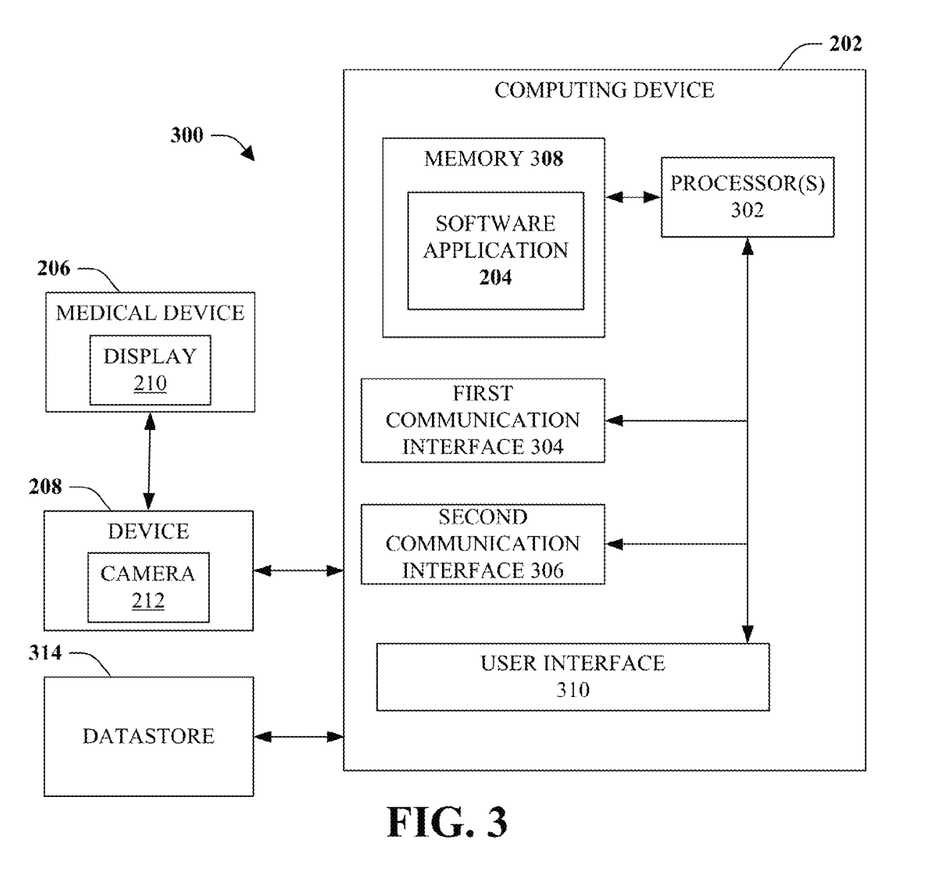
FIG. 3 is an illustration of an embodiment of a system that utilizes a computing device to analyze a captured image to identify biometric data displayed on a medical device, in accordance with one or more aspects of the present invention.

Turning to FIG. 3, a system 300 is illustrated utilizing the computing device 202 and the software module 204 to evaluate a captured image of a display of a medical device displaying biometric data. Controller 202 includes one or more processor(s) 302 configured to execute computer-executable instructions such as instructions composing software module 204. Such computer-executable instructions can be stored on one or more computer-readable media including a non-transitory, computer-readable storage medium such as memory 308 of computing device 202.

Computing device 202 may include a first communication interface 304 and a second communication interface 306. As shown in FIG. 3, first communication interface 304 can enable and process electronic communications between the computing device 202 and the device 208. It is to be appreciated that the first communication interface 304 can be a wired or wireless interface including, but not limited, a WiFi interface, an Ethernet interface, a fiber optic interface, a cellular radio interface, a satellite interface, an interface for the Internet, a LAN cable, an Ethernet cable, a USB interface, a serial interface, a WiFi interface, a short-range RF interface (Bluetooth), an infrared interface, a near-field communication (NFC) interface, etc. Second communication interface 306 can enable and process electronic communications between the computing device 202 and datastore 314. As such, second communication interface 306 can be a WiFi interface, an Ethernet interface, a fiber optic interface, a cellular radio interface, a satellite interface, an interface for the Internet, a LAN cable, an Ethernet cable, a USB interface, a serial interface, a WiFi interface, a short-range RF interface (Bluetooth), an infrared interface, a near-field communication (NFC) interface, etc. While shown separate in FIG. 3, first communication interface 304 and second communication interface 306 can be a single interface or an interface capable of simultaneous communication over multiple connections.

Computing device 202 can further include a user interface 310 that comprises various elements to obtain data representative of user input, to convey data representative of user output, obtain data input from a user, and the like. For instance, user interface 310 can comprise a web interface or website that operates as both an input device and an output device. In addition, user interface 310 can also include various buttons, switches, keys, a physical button or input, a digital representation of a button or input, a GUI, a web-based GUI, etc. by which a user can input information to computing device 202, and other displays, LED indicators, etc. by which other information can be output to the user. In addition, user interface 310 can also include various buttons, switches, keys, a physical button or input, a digital representation of a button or input, a GUI, a web-based GUI, etc. by which a user can input information to device 208, and other displays, LED indicators, etc. by which other information can be output to the user.

In accordance with an embodiment, computing device 202 is at least one of a computing device, a network, a server, a website, the software module 204 executed thereon, and the like. However, it is to be appreciated that the controller 202 can be other portable form-factors such as a laptop computer, a convertible laptop, a cell phone, a PDA, a pocket computing device, a watch computing device, or the like. Moreover, it is to be appreciated that the functionality described herein with respect to the computing device 202 can be performed by a desktop computer, or other larger, less portable computing device. That is, software module 204 can be installed and executed on substantially any computing device provided that such a computing device can communicate with the device 208 or a database or memory 308 storing data related to indicia, assets, captured images, and the like as described above and below with regard to FIGS. 2-4. Although a single computing device 202 is illustrated in FIG. 3, it is to be appreciated that one or more computing device 202 can be utilized with the subject innovation. For example, a first computing device can be employed to process communications with the device 208, a second computing device can be employed to process captured image data and/or identify alpha-numeric symbols, a third computing device can be employed to create an electronic record for the user, a fourth computing device can be employed to communicate the machine readable biometric data to the datastore 314, and the computing devices can communicate between one another.

It is to be appreciated that the computing device 202 and/or the software module 204 can be a network or a portion of a network, wherein the network is at least one of a website, a server, a computer, a cloud-service, a processor and memory 308, or a computing device connected to the Internet and configured to transmit/receive data with at least one of the device 208, the datastore 314, a website, a web application, an applet, a server, a network, a memory 308, or a combination thereof. In general, the network can be coupled to one or more devices via wired or wireless connectivity in which data communications are enabled between the network and at least one of a second network, a subnetwork of the network, or a combination thereof. It is to be appreciated that any suitable number of networks can be used with the subject innovation and data communication on networks can be selected by one of sound engineering judgment and/or one skilled in the art.

It is to be appreciated that the alpha-numeric symbols and/or machine-readable biometric data can be communicated to a datastore, a database, a webserver, a server, a network, an applet, a software, an application, and the like. The machine-readable biometric data can be utilized to create or append an electronic record, file, or history for the user of the medical device.

Figure 4:
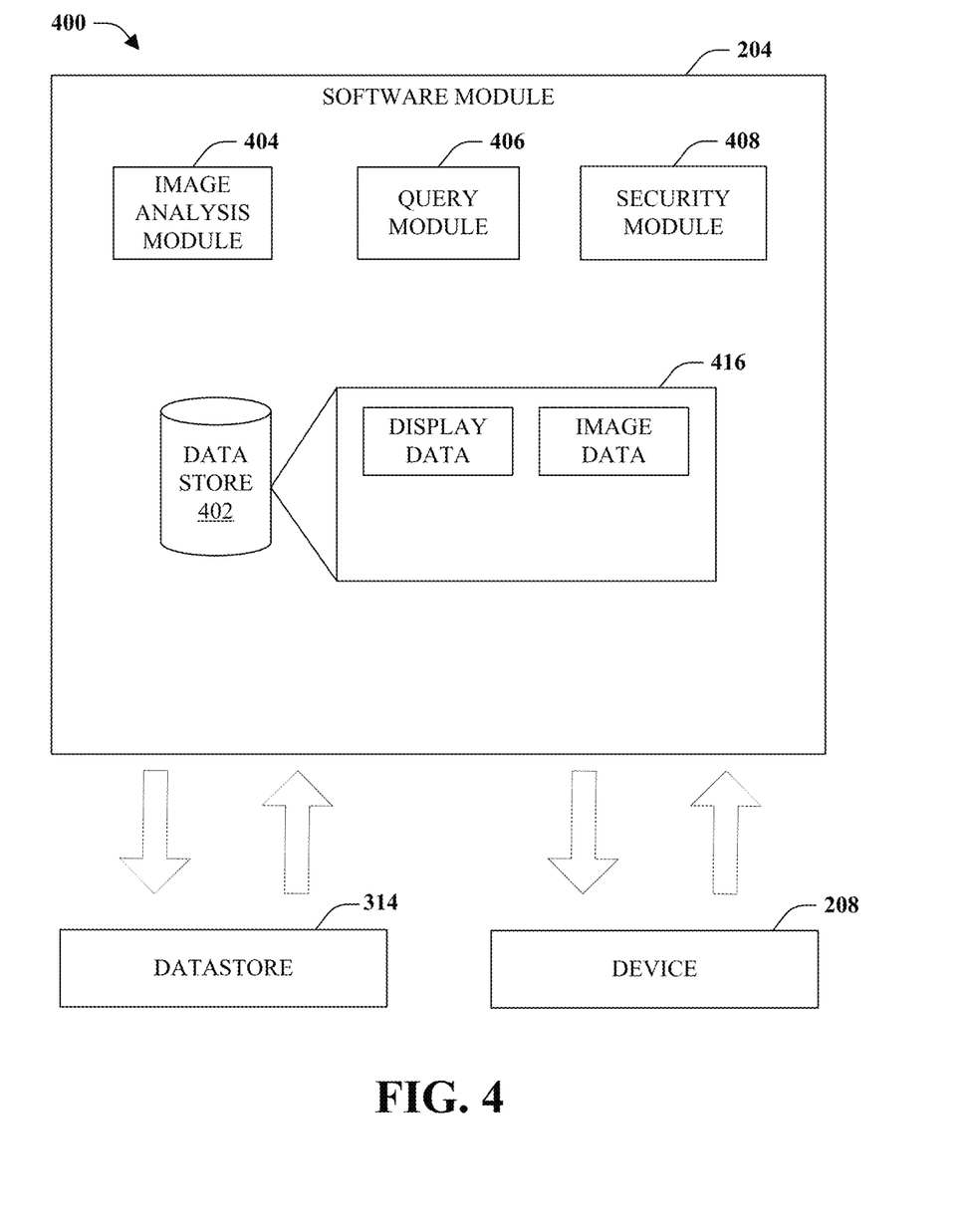
FIG. 4 is a block diagram of an exemplary, non-limiting software module, in accordance with one or more aspects of the present invention.

FIG. 4 illustrates a system 400 of the software module 204 that performs data analysis on one or more captured images of the display 210. The software application 204 can further include a data store 402, image analysis module 404, query module 406, security module 408, and the like (collectively referred to as "the modules") and support data 420 stored in the data store 402. The modules include computer-executable instructions implementing various features, processes, operations, etc. of software module 204. The system 400 is an exemplary, non-limiting embodiment of software module 204 according to one or more aspects. The software module 204 comprises computer-executable instructions and computer-readable data stored, for example on memory 308, of computing device 202. The computer-executable instructions of software module 204 are executable by processor 302 of computing device 202. The computer-executable instructions of software module 204 may include instructions for carrying out one or more embodiments of method 100 as described above, and may further be configured to carry out a portion of an embodiment of method 100 or all steps of an embodiment of method 100 as described above.

It is to be appreciated that the data store 402 can be, for example, either volatile memory or nonvolatile memory, or can include both volatile and nonvolatile memory. The data store 402 of the subject systems and methods is intended to comprise, without being limited to, these and other suitable types of memory. In addition, it is to be appreciated that the data store 402 can be a server, a database, a hard drive, a flash drive, an external hard drive, a portable hard drive, a cloud-based storage, a solid state drive, and the like.

The data store 402 can store support data 420 utilized by the software module 204, communicated between the computing device 202 and the device 208, communicated between the computing device 202 and the datastore 314, communicated between the computing device 202 and another component or device, and/or any combination thereof. Further, it is to be appreciated that the software module 204 can be a stand-alone application on the computing device 202, integrated into the device 208, integrated into the camera 212, integrated into the datastore 314, hosted by a server, hosted by a network, and/or any combination thereof.

The image analysis module 404 can be configured to perform one or more image analysis on a captured image. The query module 3406 can be configured to receive a data query, analyze the datastore 402, and communicate a query result to the data query. Based on the data query, a query result can be communicated which satisfies the data query.

The security module 410 can be configured to validate or verify user identity and/or whether biometric data in a captured image is from a particular user.

As shown in FIG. 4, software module 204 includes various support data 420. Support data 420 includes display data (e.g. data related or associated with the display of a particular medical device, a screen layout, a location of specific data or data fields on a medical device, a type of data to be displayed in a data field of a display of a medical device, and the like), image data (e.g., device 208 that captured the image, location of device 208, user of the medical device 206 that appears in the image, time when the image was captured, date when the image was captured, format of the image captured, among others), among others. It is to be appreciated that although depicted incorporated into the software module 204, the datastore 402 can be a stand-alone component, a server, a networked device, a cloud-based storage, a combination thereof, among others.

In an embodiment, the medical device 206 is electrically coupled to the display. In an embodiment, the medical device 206 is wirelessly in communication with the display. In an embodiment, the system can include a third software module that is configured to be executed by a processor for enabling the processor to receive the image from the memory and perform a second image analysis on the image, wherein the second image analysis results in identifying a reference image corresponding to one or more medical devices. In an embodiment, the software module is further configured to perform a comparison between the reference image and the image to identify alpha-numeric symbols from the image, and may identify a data type of the alpha-numeric symbols from the image. In an embodiment, the system can include a fourth software module that is configured to divide the image into two or more subsections in which the software modules performs the first image analysis on each of the two or more subsections.

The aforementioned systems, devices, applications, modules, components, (e.g., computing device 202, device 208, medical device 206, software application 204, datastore 314, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Furthermore, as will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers and the like). Such components, inter alia, can automate certain mechanisms or processes performed thereby to make portions of the systems and methods more adaptive as well as efficient and intelligent. By way of example and not limitation, at least one of the following: 1) the software application 204 or one or more sub-components thereof; and/or 2) the device 208 or camera 212 or one or more sub-components thereof; can employ such mechanisms to efficiently determine or otherwise infer alpha-numeric information from an image of visually communicated biometric data captured by a medical device.

As used herein, the terms "component," "module," and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

It is to be appreciated that an "application" can include one or more modules that perform one or more functionalities via instructions stored on a memory executed by a processor. Moreover, although a module and functionality may be described as a single module, it is to be appreciated that modules and respective functionalities can be combined into two or more modules. Additionally, one or more applications can be provided to include the one or more modules described herein. For example, the software application 204 can be comprised of one or more applications that perform the functionalities described herein, wherein the one or more applications include one or more of the modules described herein.

It is to be appreciated that the "application" (here the software application 204) can be hosted in a cloud, on a mobile device, on a server, on a computing device (e.g., computing device 202, a server, a network, a website, and the like), and/or a combination thereof. Moreover, although a single processor and/or memory is illustrated, it is to be appreciated that one or more processors and/or one or more memory can be employed with the subject innovation.

Figure 5:
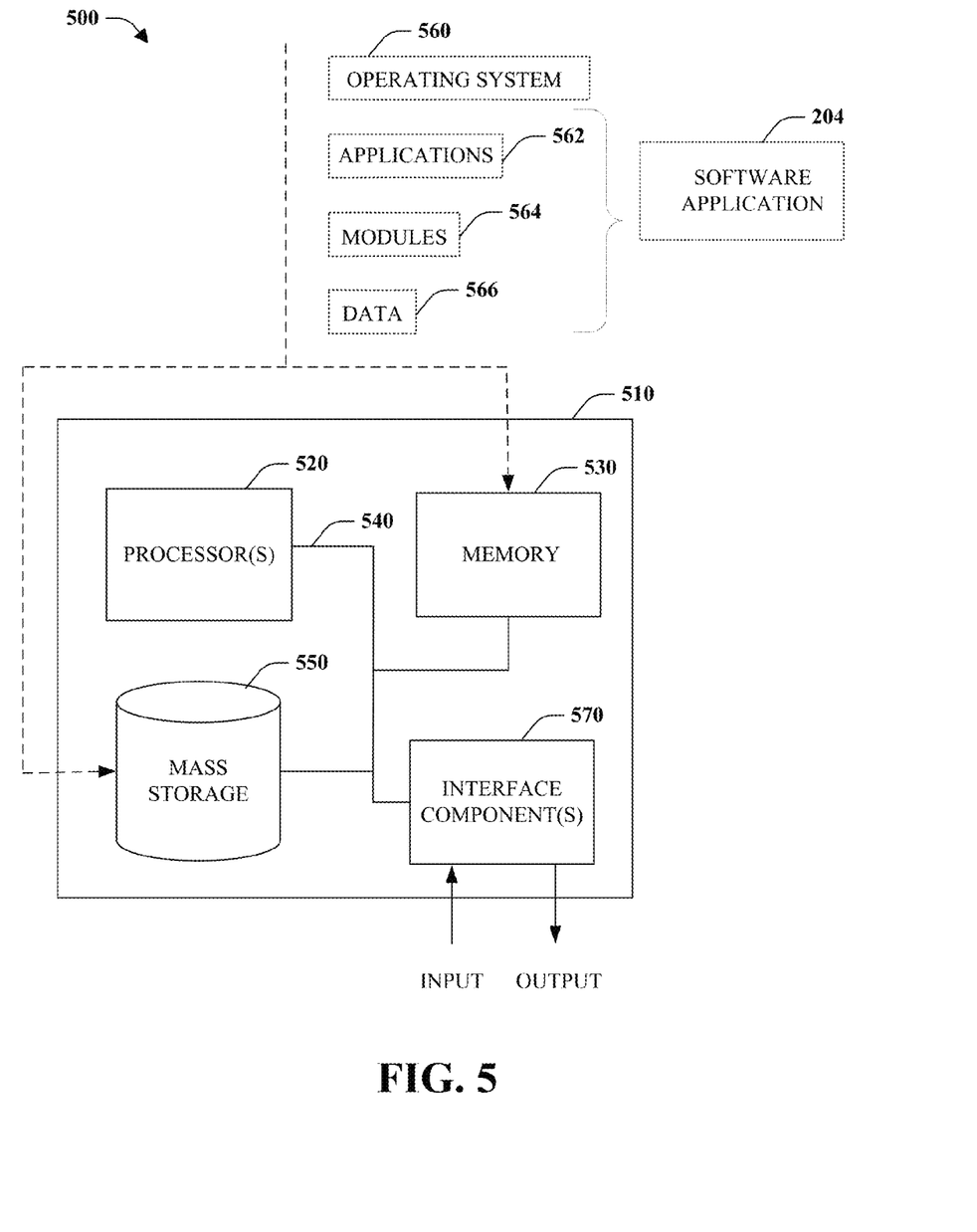
FIG. 5 is a schematic block diagram illustrating a suitable operating environment, in accordance with one or more aspects of the present invention.

To provide further context for the claimed subject matter, FIG. 5 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), portable gaming device, smartphone, tablet, Wi-Fi device, laptop, phone, among others), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 5, illustrated is an example general-purpose computer 510 or computing device (e.g., desktop, laptop, server, hand-held, programmable consumer or industrial electronics, set-top box, game system . . . ). The computer 510 includes one or more processor(s) 520, memory 530, system bus 540, mass storage 550, and one or more interface components 570. The system bus 540 communicatively couples at least the above system components. However, it is to be appreciated that in its simplest form the computer 510 can include one or more processors 520 coupled to memory 530 that execute various computer executable actions, instructions, and or components stored in memory 530.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration.

The computer 510 can include or otherwise interact with a variety of computer-readable media to facilitate control of the computer 510 to implement one or more aspects of the claimed subject matter. The computer-readable media can be any available media that can be accessed by the computer 510 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 510.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 530 and mass storage 550 are examples of computer-readable storage media. Depending on the exact configuration and type of computing device, memory 530 may be volatile (e.g., RAM), non-volatile (e.g., ROM, flash memory . . . ) or some combination of the two. By way of example, the basic input/output system (BIOS), including basic routines to transfer information between elements within the computer 510, such as during start-up, can be stored in nonvolatile memory, while volatile memory can act as external cache memory to facilitate processing by the processor(s) 520, among other things.

Mass storage 550 includes removable/non-removable, volatile/non-volatile computer storage media for storage of large amounts of data relative to the memory 530. For example, mass storage 550 includes, but is not limited to, one or more devices such as a magnetic or optical disk drive, floppy disk drive, flash memory, solid-state drive, or memory stick.

Memory 530 and mass storage 550 can include, or have stored therein, operating system 560, one or more applications 562, one or more program modules 564, and data 566. The operating system 560 acts to control and allocate resources of the computer 510. Applications 562 include one or both of system and application software and can exploit management of resources by the operating system 560 through program modules 564 and data 566 stored in memory 530 and/or mass storage 550 to perform one or more actions. Accordingly, applications 562 can turn a general-purpose computer 510 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the software application 204 (associated functionality, modules, and/or portions thereof) can be, or form part, of an application 562, and include one or more modules 564 and data 566 stored in memory and/or mass storage 550 whose functionality can be realized when executed by one or more processor(s) 520. Moreover, it is to be appreciated that the software, firmware, or combination thereof to perform the functionality of the described components herein can be downloaded, installed, or a combination thereof from any host. For instance, the host can be an online store, a website, an IP address, an application store, a network, a storage medium, a portable hard disk, a server, or the Internet.

In accordance with one particular embodiment, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the software application 204 (associated functionality, modules, and/or portions thereof) can be embedded within hardware in a SOC architecture.

The computer 510 also includes one or more interface components 570 that are communicatively coupled to the system bus 540 and facilitate interaction with the computer 510. By way of example, the interface component 570 can be a port (e.g., serial, parallel, PCMCIA, USB, FireWire . . . ) or an interface card (e.g., sound, video . . . ) or the like. In one example implementation, the interface component 570 can be embodied as a user input/output interface to enable a user to enter commands and information into the computer 510 through one or more input devices (e.g., pointing device such as a mouse, trackball, stylus, touch pad, keyboard, microphone, joystick, game pad, satellite dish, scanner, camera, other computer . . . ). In another example implementation, the interface component 570 can be embodied as an output peripheral interface to supply output to displays (e.g., CRT, LCD, plasma . . . ), speakers, printers, and/or other computers, among other things. Still further yet, the interface component 570 can be embodied as a network interface to enable communication with other computing devices (not shown), such as over a wired or wireless communications link.

Figure 6:
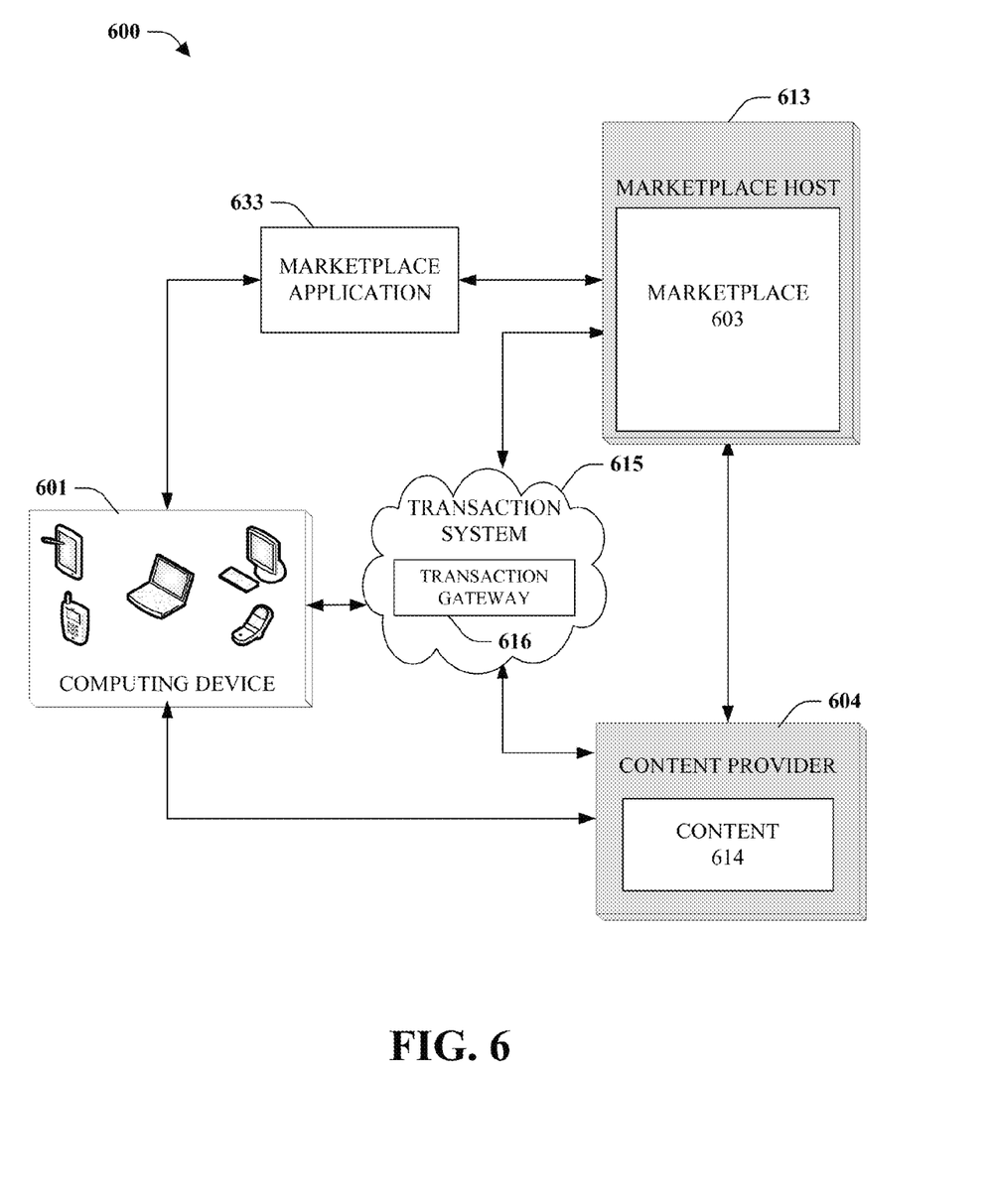
FIG. 6 is a schematic block diagram illustrating a suitable environment for delivery of data, in accordance with one or more aspects of the present invention; and, FIG. 7 is a schematic block diagram illustrating illustrates a cloud computing environment, in accordance with one or more aspects of the present invention.

FIG. 6 illustrates an operating environment 600 that can be used with the subject innovation and in particular, the software application 204. The operating environment 600 includes a computing device 601 (e.g., device smartphone, a tablet, a laptop, a desktop machine, a portable gaming device, a device with Internet connectivity, among others), a user, a marketplace 603, a content provider 804, and content 614. The operating environment 600 is configured to deliver data (e.g., content 614) to the computing device 601 based upon a request from the computing device 601 (e.g., typically initiated by a user of the computing device 601). However, it may be appreciated that the delivery of data to the computing device 601 can be pushed to the computing device 601 and further approved (e.g. acceptance of license agreement, among others) by the user. The data delivered can be from a content provider 604, wherein the data can be delivered directly to the computing device 601 or indirectly delivered to the computing device 601 via the marketplace 603 and/or the marketplace applications 633. In an embodiment, the computing device 601 can utilize a transaction system 615 that facilitates purchasing data via at least one of the marketplace 603, the marketplace applications 633, the content provider 604, and the like. The transaction system 615 can be configured to utilize a transaction gateway 616 to facilitate completing a transaction between entities (e.g., user, content provider, marketplace, among others).

The computing device 601 and the marketplace 603 can be configured to communicate across a network, for example, wherein the marketplace 603 is accessed via the marketplace application 633 or a user interface (UI) associated with one of the marketplace 603 or the marketplace host 613. The marketplace 603 can be hosted by a marketplace host 613 associated with any suitable host, server, computer, data store, and the like.

In one embodiment, the computing device 601 is mobile so that it may function for a period of time without requiring a physical connection to a power source or network provider. For example, a cellular network or a Wi-Fi connection can be used by the computing device 601 in order to transmit and/or receive data within the operating environment 600.

A user can employ the computing device 601 for the device's intended functions as well as communicating data with the marketplace 603 and/or marketplace host 613.

Commonly, the user purchases content 614 and/or products from the content provider 604 via the transaction system 615. It is to be appreciated that the marketplace 603 can be in an electronic form such as a website, the marketplace application 633, or an executable program. In a preferred embodiment, the marketplace 603 takes the form of the marketplace application 633 configured to run on the user's computing device 601. The marketplace application 633 may be utilized to install the content 614 from the content provider 604 onto the computing device 601.

The marketplace 603 can further connect the content provider 604 and/or the content 614 of the content provider 604 with the computing device 601 to allow the user to receive content 614 via a download (e.g., communication of data packets). The marketplace 603 can offer the user a variety of content 614 for purchase (via the transaction system 615) or for free of charge. The content 614 offered by the marketplace 603 may also come from the marketplace host 613. For example, the content provider 604 can have a website for direct delivery of content 614 or have content 614 hosted in the marketplace 603 by the marketplace host 613. Thus, in such an example, a user can directly receive data or content from the website of the content provider 604 or use the marketplace application 633 to identify the content 614 for receipt through the marketplace 603. Moreover, the content 614 can be tailored to the computing device 601. For instance, a first content can be built for a first computing device having a first operating system and a second content can be built for a second computing device having a second operating system, wherein the first content and the second content can be from the content provider 604.

In some embodiments, the system 600 utilizes the transaction system 615. The transaction system 615 can include a transaction gateway 616 that facilitates transactions between at least the marketplace host 613, one or more users, the marketplace 603, and/or the content provider 604. When the user purchases content 614 from the marketplace 603 or content provider 604, a transaction gateway 616 can receive a request to apply a charge to a user account (e.g., a monetary value via an electronic transaction via an account) owned or authorized by the user. For example, the user account can be, but is not limited to being, a credit card account, an account with the content provider 604 or marketplace host 613, a bank account, a debit account, an e-commerce account (e.g. Pay-Pal®), an electronic account, a savings account, and the like.

The transaction gateway 616 can store transaction data (e.g., user account, username, password, data related to the user, data related to the computing device 601, among others) specific to a transaction to receive content 614. The transaction gateway 616 can further collect and/or store data regarding one or more users, wherein the data can be, but is not limited to, credit card numbers, to make it easier for the one or more users to engage in multiple transactions (e.g., simultaneously and/or various points in time). The transaction gateway 616 can further reverse a transaction between one or more parties involved, such as providing a refund to the user.

It is to be appreciated that a purchase may not require the transfer of finances. For example, the content 614 on the marketplace 603 could be free to download. Additionally, a portion of the transaction system 615 can be integrated into at least one of the content provider 604, the marketplace host 613, the marketplace application 633, or a combination thereof. In another embodiment, the first content 614 can be free but additional content related to the first content 614 can require a purchase.

The content provider 604 can create content 614 (e.g., also referred to as products, software, apps, applications, and the like) that can be sold on the marketplace 603. By way of example and not limitation, the content provider 604 can be a videogame company that creates a game to be made available for download from the marketplace 603. By way of another example and not limitation, a bank can develop a mobile banking application that is communicated to the marketplace 603 and made available for download via the marketplace 603. In such example, the bank is the content provider 604. Additionally, the bank may host the mobile banking application on the bank's website for download or delivery to users. It is to be appreciated and understood that the content provider 604 is not limited to these examples and the content provider 804 can be any suitable entity (e.g., user, company, business, group of users, and the like) that creates or develops content 614 to be distributed to the marketplace host 613 for download via the marketplace 603.

The marketplace host 613 maintains the marketplace 603 on a network. The marketplace host 613 owns and/or controls a host server that contains the marketplace 603, and provides the user access to the marketplace 603. The marketplace host 613 can further control an amount of bandwidth allocated to the user to download the content 614 of the one or more content providers 604. In a non-limiting embodiment, the marketplace host 613 can own and/or control the marketplace 603. In another non-limiting embodiment, the marketplace host 613 can host the marketplace 603 on a network to enable access by the user.

In an exemplary embodiment, a user accesses the marketplace 603 via the marketplace application 633 located on the computing device 601. The computing device 601 can have access to the network 605, and the computing device 601 can communicate data in the form of a query to the marketplace host 613, wherein the data can be a request for information on content 614. The marketplace host 613 can communicate data in the form of a query result (which can include content 614) via a network to the computing device 601 for review, install, use, storage, and the like. In a non-limiting embodiment, the computing device 601 can include a user-interface that displays the data (e.g., the query, the query result, the content 614, among others) for the user.

Prior to download of content 614, the user can further navigate information regarding the content 614 that is displayed and select to either request additional content 614 or to purchase the content 614. If the user selects to purchase content 614, the marketplace application 633 communicates a purchase request to the marketplace host 613. The marketplace host 613 can then use the transaction system 615 which includes the transaction gateway 616 charging the user account if data related to the user account is available, and if the user account is not available, then the marketplace host 613 can request user account 612 information from the user which can then be sent to the transaction gateway 616. Upon receipt of the user account information, the transaction gateway 616 can charge the user account, and send a confirmation of the transaction back to the marketplace host 613.

The marketplace host 613 can then communicate the confirmation information to the computing device 601, as well as enable the user to download data for the content 614 and/or the marketplace application 633 stored in a host server regarding the specific content 614 and/or marketplace application 633 purchased. The marketplace application 633 can further assist with installation of the content 614 or marketplace application 633 purchased onto the computing device 601. It is to be appreciated and understood that the above process can occur in any order, such as a downloading of application information from the marketplace host 613 prior to the transaction and the order of the above described process is not to be limiting on the subject innovation.

One of ordinary skill in the art can appreciate that the various embodiments of system that provides a service through, for example, software, described herein can be implemented in connection with any computing device, client device, or server device, which can be deployed as part of a computer network or in a distributed computing environment such as the cloud. The various embodiments described herein can be implemented in substantially any computer system or computing environment having any number of memory or storage units, any number of processing units, and any number of applications and processes occurring across any number of storage units and processing units. This includes, but is not limited to, cloud environments with physical computing devices (e.g., servers) aggregating computing resources (i.e., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices.

The client computing devices can access the computing services or functionality via application program interfaces (APIs), web browsers, or other standalone or networked applications. Accordingly, aspects of the system that provides a service through, for example, software can be implemented based on such a cloud environment. For example, the software application 204 (as seen in previous figures) can reside in the cloud environment such that the computer-executable instruction implementing the functionality thereof are executed with the aggregated computing resources provided by the plurality of physical computing devices. The cloud environment provides one or more methods of access to the subject innovation, which are utilized the software application 204. In an embodiment, software and/or a component can be installed on a mobile device to allow data communication between the mobile device and the cloud environment. These methods of access include IP addresses, domain names, URLs, etc. Since the aggregated computing resources can be provided by physical computing device remotely located from one another, the cloud environment can include additional devices such as a routers, load balancers, switches, etc., that appropriately coordinate network data.

Figure 7:
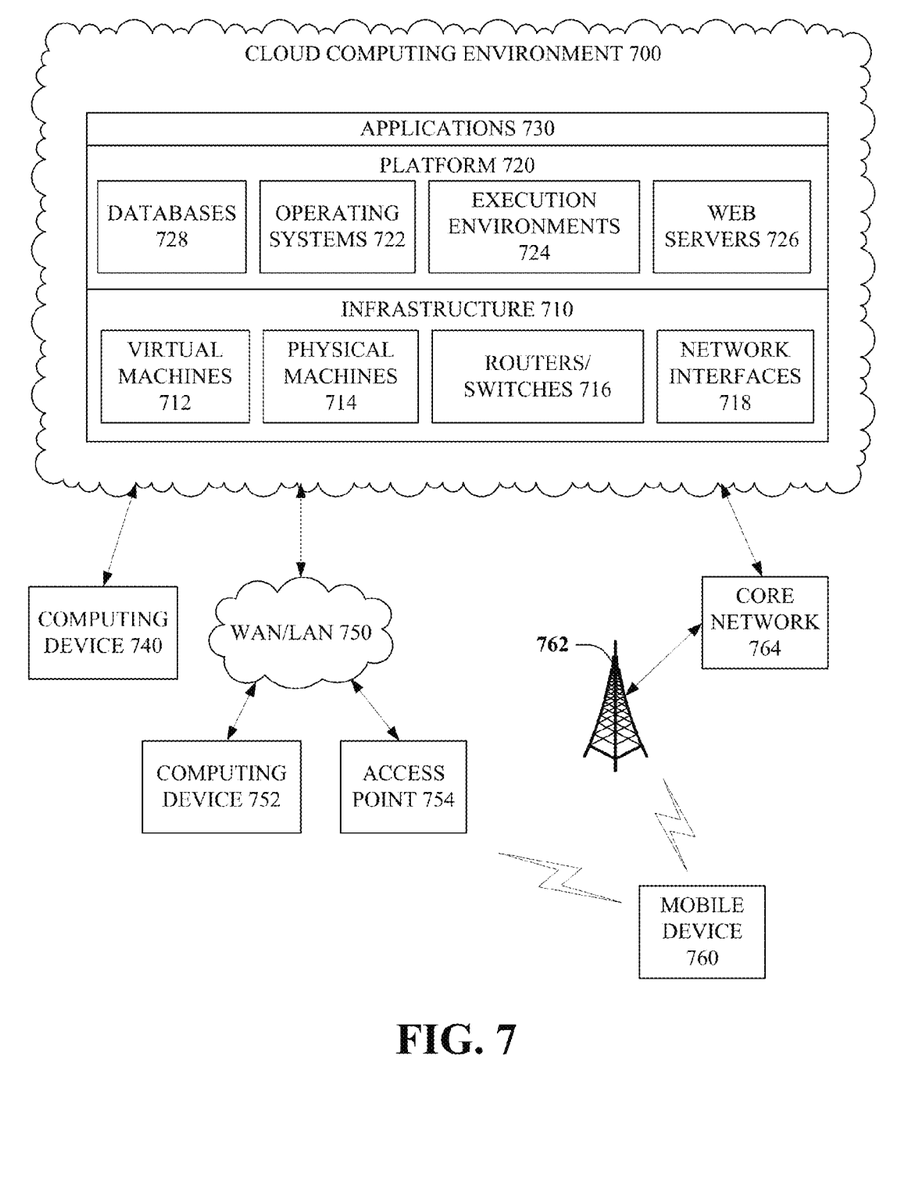

FIG. 7 provides a schematic diagram of an exemplary networked or distributed computing environment, such as a cloud computing environment 700. The cloud computing environment 700 represents a collection of computing resources available, typically via the Internet, to one or more client devices. The cloud computing environment 700 comprises various levels of abstraction: infrastructure 710, a platform 720, and applications 730. Each level, from infrastructure 710 to applications 730 is generally implemented on top of lower levels, with infrastructure 710 representing the lowest level.

Infrastructure 710 generally encompasses the physical resources and components on which cloud services are deployed. For instance, infrastructure 710 can include virtual machines 712, physical machines 714, routers/switches 716, and network interfaces 718. The network interfaces 718 provide access to the cloud computing environment 700, via the Internet or other network, from client devices such as computing devices 740, 752, 760, etc. That is, network interfaces 718 provide an outermost boundary of cloud computing environment 700 and can couple the cloud computing environment 700 to other networks, the Internet, and client computing devices. Routers/switches 716 couple the network interfaces 718 to physical machines 714, which are computing devices comprising computer processors, memory, mass storage devices, etc. Hardware of physical machines 714 can be virtualized to provide virtual machines 712. In an aspect, virtual machines 712 can be executed on one or more physical machines 714. That is, one physical machine 714 can include a plurality of virtual machines 712.

Implemented on infrastructure 710, platform 720 includes software that forming a foundation for applications 730. The software forming platform 720 includes operating systems 722, programming or execution environments 724, web servers 726, and databases 728. The software of platform 720 can be installed on virtual machines 712 and/or physical machines 714.

Applications 730 include user-facing software applications, implemented on platform 720, that provide services to various client devices. In this regard, the software application 104 described herein is an example application 730. As illustrated in FIG. 7, client devices can include computing devices 740, 752 and mobile device 760. Computing devices 740, 752 can be directly coupled to the Internet, and therefore the cloud computing environment 700, or indirectly coupled to the Internet via a WAN/LAN 750. The WAN/LAN 750 can include an access point 754 that enables wireless communications (e.g., WiFi) with mobile device 760. In this regard, via access point 754 and WAN/LAN 750, mobile device 760 can communicate wirelessly with the cloud computing environment 700. Mobile device 760 can also wirelessly communicate according to cellular technology such as, but not limited to, GSM, LTE, WiMAX, HSPA, etc. Accordingly, mobile device 760 can wireless communicate with a base station 762, which is coupled to a core network 764 of a wireless communication provider. The core network 764 includes a gateway to the Internet and, via the Internet, provides a communication path to the cloud computing environment 700.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed:

1. A method comprising:
   generating machine-readable biometric data from a medical device, the step of generating machine-readable biometric data further comprising:
   obtaining an image of the medical device, the image including a display of the medical device;
   retrieving a reference image of a reference display corresponding to the medical device, the reference image defining a reference data field within the reference display, wherein the reference image defining a reference data field further defines a reference data type;
   comparing the image to the reference image to identify a data field within the display corresponding to the reference data field within the reference display;
   identifying, within the data field, one or more alpha-numeric symbols, wherein the one or more alpha-numeric symbols within the data field comprise at least one symbol corresponding to data; and
   converting the one or more alpha-numeric symbols into the machine-readable biometric data, wherein the step of converting comprises converting the data into machine-readable data and combining the machine-readable data with the reference data type, the machine-readable data and the reference data type comprising the machine-readable biometric data.

2. The method of claim 1, further comprising:
identifying a user of the medical device;
obtaining machine-readable user data corresponding to the user of the medical device;
correlating the machine-readable biometric data to the machine-readable user data to create a data record for the user.

3. The method of claim 2, wherein identifying the user of the medical device comprises the user providing user authentication data to a website.

4. The method of claim 1, wherein the one or more alpha-numeric symbols within the data field further comprise at least one other symbol corresponding to a data type associated with the data, wherein the identifying further comprises parsing the one or more alpha-numeric symbols into the data and the data type, and wherein the converting comprises converting the data type into a machine readable data type.

5. The method of claim 1, wherein the data field is one data field of a plurality of data fields and the reference data field is one reference data field of a plurality of reference data fields, the plurality of data fields corresponding to the plurality of reference data fields, and wherein the identifying further comprises identifying one or more alpha-numeric symbols within at least one other data field of the plurality of data fields and the converting further comprises converting the one or more alpha-numeric symbols of the at least one other data field into additional machine-readable biometric data.

6. The method of claim 1, wherein the method further comprises dividing the data field within the image into a plurality of regions, wherein the identifying comprises identifying one or more alpha-numeric symbols within each region of the plurality of regions, and the method further comprising assembling the identified one or more alpha-numeric symbols prior to converting the one or more alpha-numeric symbols into the machine-readable data.

7. The method of claim 1, wherein the display of the medical device comprises a digital display and wherein the one or more alpha-numeric symbols are one or more digitally formatted alpha-numeric symbols.

8. The method of claim 1, wherein obtaining the image comprises optically capturing the image of the medical device, and retrieving the reference image comprises:
accessing a plurality of reference images;
measuring a correlation between the image and each of the plurality of reference images using a two-dimensional (2D) registration process;
quantifying a degree of correlation between the image and each of the plurality of reference images; and,
selecting and retrieving the reference image having the highest degree of correlation.

9. A non-volatile computer-readable storage medium having computer-executable code stored thereon, the computer-executable code comprising instructions for carrying out a method, the method comprising:
generating machine-readable biometric data from a medical device, the step of generating machine-readable biometric data further comprising:
obtaining an image of the medical device, the image including a display of the medical device;
retrieving a reference image of a reference display corresponding to the medical device, the reference image defining a reference data field within the reference display, wherein the reference image defining a reference data field further defines a reference data type;
comparing the image to the reference image to identify a data field within the display corresponding to the reference data field within the reference display;
identifying, within the data field, one or more alpha-numeric symbols, wherein the one or more alpha-numeric symbols within the data field comprise at least one symbol corresponding to data; and
converting the one or more alpha-numeric symbols into the machine-readable biometric data, wherein the step of converting comprises converting the data into machine-readable data and combining the machine-readable data with the reference data type, the machine-readable data and the reference data type comprising the machine-readable biometric data.

10. The non-volatile computer-readable storage medium of claim 9, wherein the method further comprises:
identifying a user of the medical device;
obtaining machine-readable user data corresponding to the user of the medical device;
correlating the machine-readable biometric data to the machine-readable user data to create a data record for the user.

11. The non-volatile computer-readable storage medium of claim 10, wherein identifying the user of the medical device comprises the user providing user authentication data to a website.

12. The non-volatile computer-readable storage medium of claim 9, wherein the one or more alpha-numeric symbols within the data field further comprise at least one other symbol corresponding to a data type associated with the data, wherein the identifying comprises parsing the one or more alpha-numeric symbols into the data and the data type, and wherein the converting comprises converting the data type into a machine readable data type.

13. The non-volatile computer-readable storage medium of claim 9, wherein the data field is one data field of a plurality of data fields and the reference data field is one reference data field of a plurality of reference data fields, the plurality of data fields corresponding to the plurality of reference data fields, and wherein the identifying further comprises identifying one or more alpha-numeric symbols within at least one other data field of the plurality of data fields and the converting further comprises converting the one or more alpha-numeric symbols of the at least one other data field into additional machine-readable biometric data.

14. The non-volatile computer-readable storage medium of claim 9, wherein the method further comprises dividing the data field within the image into a plurality of regions, wherein the identifying comprises identifying one or more alpha-numeric symbols within each region of the plurality of regions, and the method further comprising assembling the identified one or more alpha-numeric symbols prior to converting the one or more alpha-numeric symbols into the machine-readable data.

15. The non-volatile computer-readable storage medium of claim 9, wherein the display of the medical device comprises a digital display and wherein the one or more alpha-numeric symbols are one or more digitally formatted alpha-numeric symbols.

16. The non-volatile computer-readable storage medium of claim 9, wherein obtaining the image comprises optically capturing the image of the medical device, and retrieving the reference image comprises:
accessing a plurality of reference images;
measuring a correlation between the image and each of the plurality of reference images using a two-dimensional (2D) registration process;

quantifying a degree of correlation between the image and each of the plurality of reference images; and, selecting and retrieving the reference image having the highest degree of correlation.

17. A system comprising:
a medical device comprising a display, wherein the medical device is configured to obtain biometric data from a user of the medical device and show the biometric data on the display;
a device configured to create an image of the medical device, the image including the display of the medical device,
a database comprising a reference image of a reference display corresponding to the medical device, the reference image defining a reference data field within the reference display, wherein the database is a first database and the system further comprises a website and a second database, wherein the website is configured to identify the user of the medical device and obtain machine-readable user data corresponding to the user of the medical device;

a computer program product comprising a computer usable medium having computer-executable code store thereon, the computer-executable code comprising instructions for carrying out a method of generating machine-readable biometric data from a medical device, the step of generating machine-readable biometric data further comprising:

obtaining the image of the medical device;

retrieving the reference image;

comparing the image to the reference image to identify a data field within the display corresponding to the reference data field within the reference display;

identifying, within the data field, one or more alpha-numeric symbols;

converting the one or more alpha-numeric symbols into the machine-readable biometric data; and correlating the machine-readable biometric data to the machine-readable user data to create a data record for the user within the second database.

* * * * *